(12) United States Patent
Dent

(10) Patent No.: US 8,259,845 B2
(45) Date of Patent: Sep. 4, 2012

(54) METHOD AND APPARATUS FOR COMMUNICATING WITH ROOT-NYQUIST, SELF-TRANSFORM PULSE SHAPES

(75) Inventor: Paul W. Dent, Pittsboro, NC (US)

(73) Assignee: Telefonaktiebolaget L M Ericsson (publ)

( * ) Notice: Subject to any disclaimer, the term of this patent is extended or adjusted under 35 U.S.C. 154(b) by 1139 days.

(21) Appl. No.: 12/126,576

(22) Filed: May 23, 2008

(65) Prior Publication Data

US 2009/0003472 A1    Jan. 1, 2009

Related U.S. Application Data

(60) Provisional application No. 60/924,673, filed on May 25, 2007.

(51) Int. Cl.
  *H04L 25/03* (2006.01)
(52) U.S. Cl. ........................................... 375/296
(58) Field of Classification Search .............. 375/229, 375/259, 285, 295, 296, 316, 343, 346, 347, 375/348, 350; 708/300, 314, 400, 403, 404
See application file for complete search history.

(56) References Cited

U.S. PATENT DOCUMENTS

| | | | |
|---|---|---|---|
| 6,144,862 A * | 11/2000 | Oliver et al. | 455/550.1 |
| 6,219,375 B1 | 4/2001 | Dent et al. | |
| 7,046,738 B1 | 5/2006 | Dent | |
| 7,103,106 B2 | 9/2006 | Park | |
| 2003/0185313 A1 | 10/2003 | Beaulieu | |
| 2003/0231714 A1 * | 12/2003 | Kjeldsen et al. | 375/259 |
| 2004/0022175 A1 | 2/2004 | Bolinth et al. | |
| 2005/0094740 A1 * | 5/2005 | Borran et al. | 375/267 |

FOREIGN PATENT DOCUMENTS

| | | |
|---|---|---|
| JP | 11-196063 A | 7/1999 |
| JP | 2006-203807 A | 8/2006 |

OTHER PUBLICATIONS

International Search Report and Written Opinion mailed Oct. 31, 2008 in corresponding PCT application PCAT/US2008/064743.
Bolcskei et al, "Design of Pulse Shaping OFDM/OQAM Systems for High Data-Ratetransmission over Wireless Channels" IEEE International Conference on Communications, 1999, vol. 1, pp. 559-564.
International Preliminary Report on Patentability mailed Dec. 10, 2009 in corresponding PCT Application No. PCT/US2008/064743.

* cited by examiner

*Primary Examiner* — David C. Payne
*Assistant Examiner* — Vineeta Panwalkar
(74) *Attorney, Agent, or Firm* — Nixon & Vanderhye, P.C.

(57) ABSTRACT

A communication system (20) comprises a transmitter (22) and a receiver (24). The transmitter (22) comprises a source of information symbols (30); a pulse shaping wave function generator (32); and a combiner (34) configured to express the information symbols received from the source as signals which are shaped in time and frequency domains by the wave function. The pulse shaping wave function generator (32) is configured to provide a wave function which has the Nyquist property and has a same shape as its own Fourier transform. The combiner (34) is configured to combine the wave function with a stream of digital data symbols to produce a filtered stream for transmission by the transmitter.

13 Claims, 17 Drawing Sheets

|  | −3.5dT | −2.5dT | −1.5dT | −0.5dT | +0.5dT | +1.5dT | +2.5dT | +3.5dT |  |
|---|---|---|---|---|---|---|---|---|---|
| | 4.25 W | −0.75 W | 5.25 W | 1.75 W | −1.75 W | −5.25 W | −0.75 W | −4.25 W | − 3.5dW |
| | 0.75 W | 6.25 W | 3.75 W | 1.25 W | −1.25 W | −3.75 W | −6.25 W | −0.75 W | − 2.5dW |
| | 5.25 W | 3.75 W | 2.25 W | 0.75 W | −0.75 W | −2.25 W | −3.75 W | −5.25 W | − 1.5dW |
| | 1.75 W | 1.25 W | 0.75 W | 0.25 W | −0.25 W | −0.75 W | −1.25 W | −1.75 W | − 0.5dW |
| | −1.75 W | −1.25 W | −0.75 W | −0.25 W | 0.25 W | 0.75 W | 1.25 W | 1.75 W | + 0.5dW |
| | −5.25 W | −3.75 W | −2.25 W | −0.75 W | 0.75 W | 2.25 W | 3.75 W | 5.25 W | + 1.5dW |
| | −0.75 W | −6.25 W | −3.75 W | −1.25 W | 1.25 W | 3.75 W | 6.25 W | 0.75 W | + 2.5dW |
| | −4.25 W | −0.75 W | −5.25 W | −1.75 W | 1.75 W | 5.25 W | 0.75 W | 4.25 W | + 3.5dW |

*Fig. 8*

METHOD AND APPARATUS FOR COMMUNICATING WITH ROOT-NYQUIST, SELF-TRANSFORM PULSE SHAPES

This application claims the priority and benefit of U.S. Provisional Patent Application 60/924,673, entitled "Communicating With Root-Nyquist, Self-Transform Pulse Shapes", filed May 25, 2007, which is also incorporated herein by reference in its entirety.

BACKGROUND

I. Technical Field

This invention pertains to telecommunications, and particularly to the shaping of pulses which are utilized in the transmission of information in wireless telecommunications.

II. Related Art and Other Considerations

In a typical cellular radio system, wireless terminals (also known as mobile terminals, mobile stations, and mobile user equipment units (UEs)) communicate via base stations of a radio access network (RAN) to one or more core networks. The wireless terminals (WT) can be mobile stations such as mobile telephones ("cellular" telephones) and laptops with mobile termination, and thus can be, for example, portable, pocket, hand-held, computer-included, or car-mounted mobile devices which communicate voice and/or data with radio access network. The base station, e.g., a radio base station (RBS), is in some networks also called "NodeB" or "B node". The base stations communicate over the air interface (e.g., radio frequencies) with the wireless terminals which are within range of the base stations.

There are various techniques for conditioning and transmitting a signal over a radio or wireless interface, e.g., between a base station and a wireless terminal. One technique is orthogonal frequency division multiplexing (OFDM). The OFDM spread-spectrum scheme is employed for many broadly used applications, including digital TV broadcasting in Australia, Japan and Europe; digital audio broadcasting in Europe; Asynchronous Digital Subscriber Line (ADSL) modems and wireless networking worldwide (IEEE 802.11a/g).

In an OFDM system, a very high rate data stream is divided into multiple parallel low rate data streams. Each smaller data stream is then mapped to an individual data sub-carrier and modulated using some flavor of PSK (Phase Shift Keying) or QAM (Quadrature Amplitude Modulation), i.e., BPSK, QPSK, 16-QAM, 64-QAM.

Transmitting a signal at a high modulation rate through a band-limited channel, whether processed by OFDM techniques or otherwise, can create intersymbol interference. As the modulation rate increases, the signal's bandwidth increases. When the signal's bandwidth becomes larger than the channel bandwidth, the channel starts to introduce distortion to the signal, which distortion is usually seen as intersymbol interference (ISI).

A pulse shaping process can be utilized to change the waveform of the transmitted communication signal. Pulse shaping serves to render a transmitted signal better suited to the communication channel over which it is to be transmitted, and does so by, e.g., limiting the effective bandwidth of the transmission. By filtering the transmitted pulses using a pulse shaping waveform, the intersymbol interference caused by the channel can be controlled.

The pulse shape thus has significance to signal quality. A Nyquist pulse is a pulse shape that goes through zero at integer multiples of the symbol rate away from its peak, thus ensuring that, when sampled at the optimum point, the signal exhibits no Intersymbol Interference from any symbols adjacent to the sampled symbol. The Fourier Transform of the Nyquist pulse shape defines a filtering function in the frequency domain that will produce a Nyquist pulse shape at its output from an impulse at its input. Since it is usual to have filters at both the transmitter and the receiver, the former for limiting the transmitted spectrum and the latter for limiting the receiver response to adjacent channel signals, it is often decided to split the filtering function defined by the Fourier Transform of a Nyquist pulse shape equally between the transmitter and the receiver, and to thus use a "root-Nyquist" filter in each. Since the combined frequency response of the transmitter and the receiver is the product of their individual frequency responses, the result of multiplying the two root-Nyquist filters is a filter with the Nyquist property.

Pulse shapes are known in the art which are limited in their spectral extent but unlimited in their time duration, and which have the root-Nyquist property. For example, a pulse whose Fourier Transform has a Root-Raised-Cosine shape has a square which is Raised-Cosine shaped, and this is a Nyquist filter for symbol rates which are equal to twice the −6 dB single-sided bandwidth, or equal to the −6 dB two-sided bandwidth. Such a filter shape is Nyquist because, if it is folded about its −6 dB point and the overlapping folded portions added, the result is unity across the bandwidth. Therefore, no in-band frequency component of a signal is altered by the filter. Such a filter is specified to be used in the IS136 US digital cellular TDMA system standard.

Pulse shapes are also known which are limited in their time duration but which are infinite in the frequency domain, and which have the Root-Nyquist property in both the time and frequency domains. For example the IOTA pulse (Isoptropic Orthogonal Transform Algorithm) has been proposed for pulse-shaping OFDM symbols. Improvements to the IOTA pulse are also disclosed in U.S. Pat. No. 7,103,106, which is incorporated by reference herein.

That a function can be its own Fourier Transform is also known from the Gaussian function. The Gaussian function is infinite in extent in both the time and frequency domains, but falls off rapidly in both, so that ultimate truncation does not have serious deleterious effects. Gaussian filtering is specified for the GSM digital cellular system's MSK transmissions, which are then known as GMSK. Unfortunately the Gaussian waveshape is not Nyquist; therefore GSM transmissions are generally received using an equalizer to cancel the resultant intersymbol-interference, even when the propagation path does not introduce intersymbol interference (ISI).

SUMMARY

In one of its aspects the technology concerns a communication system which comprises a transmitter. The transmitter comprises a source of information symbols; a pulse shaping wave function generator; and a combiner configured to express the information symbols received from the source as signals which are shaped in time and frequency domains by the wave function. The pulse shaping wave function generator is configured to provide a wave function which has the root-Nyquist property and has a same shape as its own Fourier transform. The combiner is configured to combine the wave function with a stream of digital data symbols to produce a filtered stream for transmission by the transmitter.

In an example embodiment particularly suited for OFDM technology, the source is configured to supply successive blocks of digital data symbols represented by blocks of complex numbers. The transmitter further comprises a Fourier transform configured to perform a Fourier transform on each block of complex numbers to produce an OFDM symbol. The combiner is configured to use the wave function to weight successive OFDM symbols and to combine successive weighted OFDM symbols to produce a pulse-shaped OFDM symbol for transmission.

In another of its aspects, the technology concerns a method of operating a transmitter. In a basic mode, the method comprises providing a wave function which has the root-Nyquist property and has the same shape as its own Fourier transform; and expressing input information symbols as signals which are shaped in time and frequency domains by the wave function. For example, the method can comprise combining the wave function with the input information symbols in a form of a stream of digital data symbols to produce a filtered stream for transmission by the transmitter.

An example mode of the method particularly suited for OFDM technology comprises receiving successive blocks of digital data symbols represented by blocks of complex numbers; performing a Fourier transform on each block of complex numbers to produce an OFDM symbol; using the wave function to weight successive OFDM symbols; and, combining successive weighted OFDM symbols to produce a pulse-shaped OFDM symbol for transmission.

In an example embodiment, the pulse shaping wave function generator comprises a memory comprising a precomputed look-up table.

Thus, a family of pulse shapes is disclosed whose squares have the Nyquist property while the pulse shapes are also their own Fourier Transforms. Methods for numerically generating exemplary pulse shapes in this family are also disclosed. Such pulse shapes are useful for generating communications signals for transmitting digital data. Advantageously such pulse shapes provide a compromise between (on the one hand) pulses that are limited in their spectral extent but do not diminish rapidly with time and (on the other hand) pulses which have a finite time duration but whose spectral sidelobes do not diminish rapidly with frequency offset from the center frequency of the spectrum.

In an example implementation, a pulse shape in the family is used to weight a train of successive repeats of a symbol, and to combine it with time-shifted, weighted repeats of adjacent symbols prior to transmission to obtain a pulse-shaped symbol transmission. A receiver receives the pulse-shaped symbol transmission, and weights the pulse-shaped symbol transmission with the pulse shape again to obtain a weighted, pulse-shaped signal. Weighted, pulse-shaped transmissions separated by multiples of the symbol period in time are then added to obtain a doubly pulse-shaped signal. The doubly pulse-shaped signal, having been weighted by the square of the pulse shape, thereby exhibits no Intersymbol Interference from other symbols due to the Nyquist property of the square of the pulse shape. Furthermore, because the pulse shape is its own Fourier transform, the Nyquist property also applies in the frequency domain such that, when the symbols are OFDM symbols, interference between sub-carriers of the OFDM symbol is substantially cancelled.

It is not commonly known that functions other than the Gaussian function exist which are their own Fourier Transforms. It would be desirable if such a function could also have the Root-Nyquist property, so that the advantages of no intersymbol interference (ISI) as well as compromising between time and frequency containment could be obtained. Communicating with the aid of such pulses is disclosed herein, as well as methods to precompute such pulse shapes.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 8 is a diagrammatic view of a half-channel offset 8×8 DFT matrix which lacks a zero-frequency, zero-time element but which is perfectly symmetrical.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
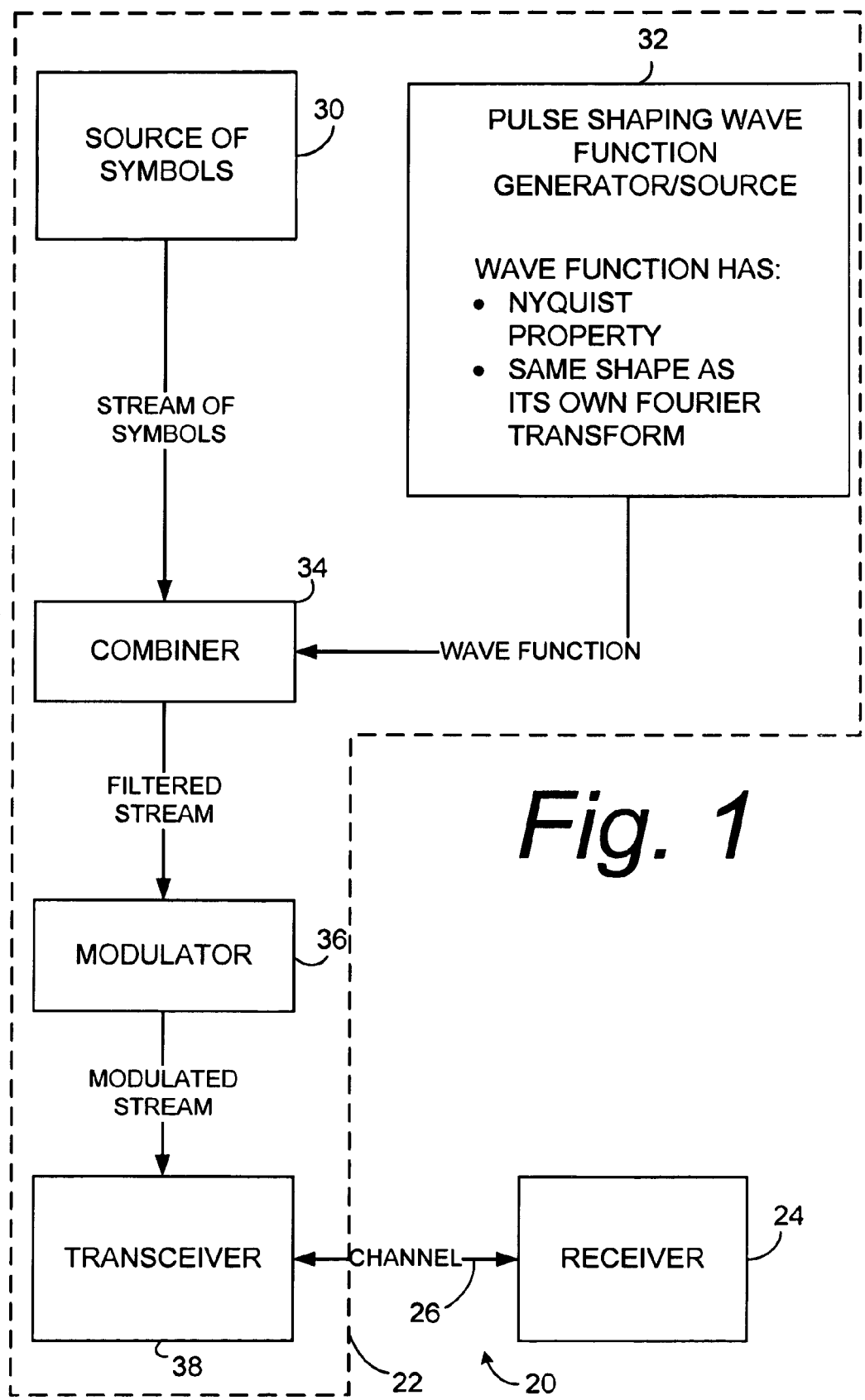
FIG. 1 is a schematic view of a communications system including a transmitter according to an example embodiment.

As shown in FIG. 1, communication system 20 comprises transmitter 22 and receiver 24 between which communication occurs over channel 26. In an example implementation, the transmitter 22 and receiver 24 comprise elements (e.g., nodes or participants) of a radio access network wherein channel 26 occurs over a wireless or radio interface. For example, transmitter 22 can belong to a base station node (also called a NodeB or BNode) and receiver 24 can belong to a wireless terminal (e.g., mobile station or user equipment unit (UE)), or conversely the transmitter 22 can belong to the wireless terminal and the receiver 24 belong to the base station node. However, environments other than a radio access network are encompassed hereby as it will be apparent that the technology is well suited for other applications and other types of transmission channels.

As further shown in FIG. 1, in its basic form transmitter 22 comprises a source of information symbols 30; pulse shaping wave function generator 32; and combiner 34. The transmitter 22 serves to express the information symbols received from the source 30 as signals which are shaped in time and frequency domains by the wave function generated by pulse shaping wave function generator 32. As explained in more detail hereinafter, pulse shaping wave function generator 32 is configured to provide a wave function that has particular characteristics, e.g., the wave function both has the root-Nyquist property and has a same shape as its own Fourier transform. The combiner 34 is configured to combine the wave function (received from pulse shaping wave function generator 32) with the stream of digital data symbols (obtained from source of information symbols 30) to produce a filtered stream for transmission by the transmitter. In the non-limiting example embodiment of FIG. 1, the filtered stream is subsequently modulated by modulator 36 before being applied to channel 26 by transceiver 38.

The person skilled in the art appreciates that transmitter 22 of FIG. 1 includes other (not illustrated) elements or components which are not germane for an understanding of the present technology. The nature and function of such other elements can depend, for example, on the type of node or device in which transmitter 22 is incorporated. Receiver 24 can include components or functionalities for demodulating the signal received over channel 26 and for deriving user data from the symbols included in the received signal, in some respect essentially the converse of what occurs in transmitter 22. Further, when the receiver 24 is included in a device or node that can also transmit information over channel 26, such device or node may include a transmitter similar to that of transmitter 22.

Figure 2:
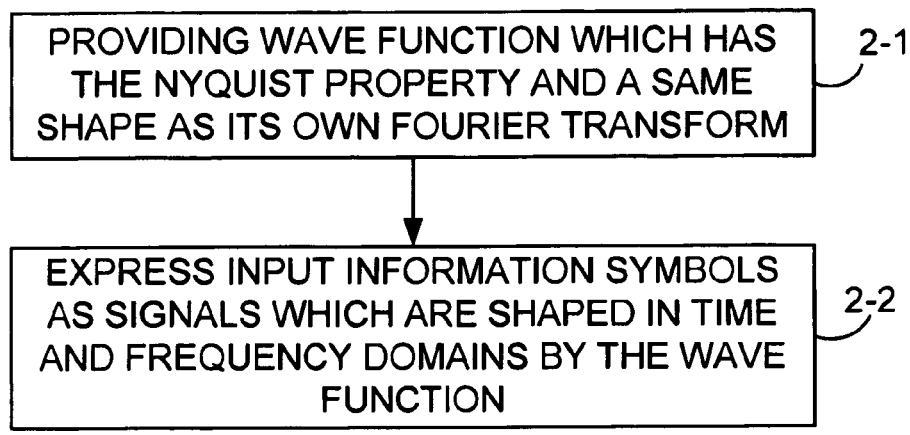
FIG. 2 is a flowchart of a method of operating a transmitter according to a first example mode.

FIG. 2 depicts basic, representative acts or steps performed in a mode of operation of a transmitter such as transmitter 22 of FIG. 1. In a basic mode, the method of FIG. 2 comprises, as act 2-1, providing a wave function which has the root-Nyquist property and has the same shape as its own Fourier transform. This wave function is provided by, e.g., pulse shaping wave function generator 32 of the FIG. 1 embodiment. Act 2-2 of the method of FIG. 2 comprises expressing input information symbols (received from source of information symbols 30) as signals which are shaped in time and frequency domains by the wave function. For example, the method can comprise combining the wave function with the input information symbols in a form of a stream of digital data symbols to produce a filtered stream for transmission by the transmitter.

Figure 3:
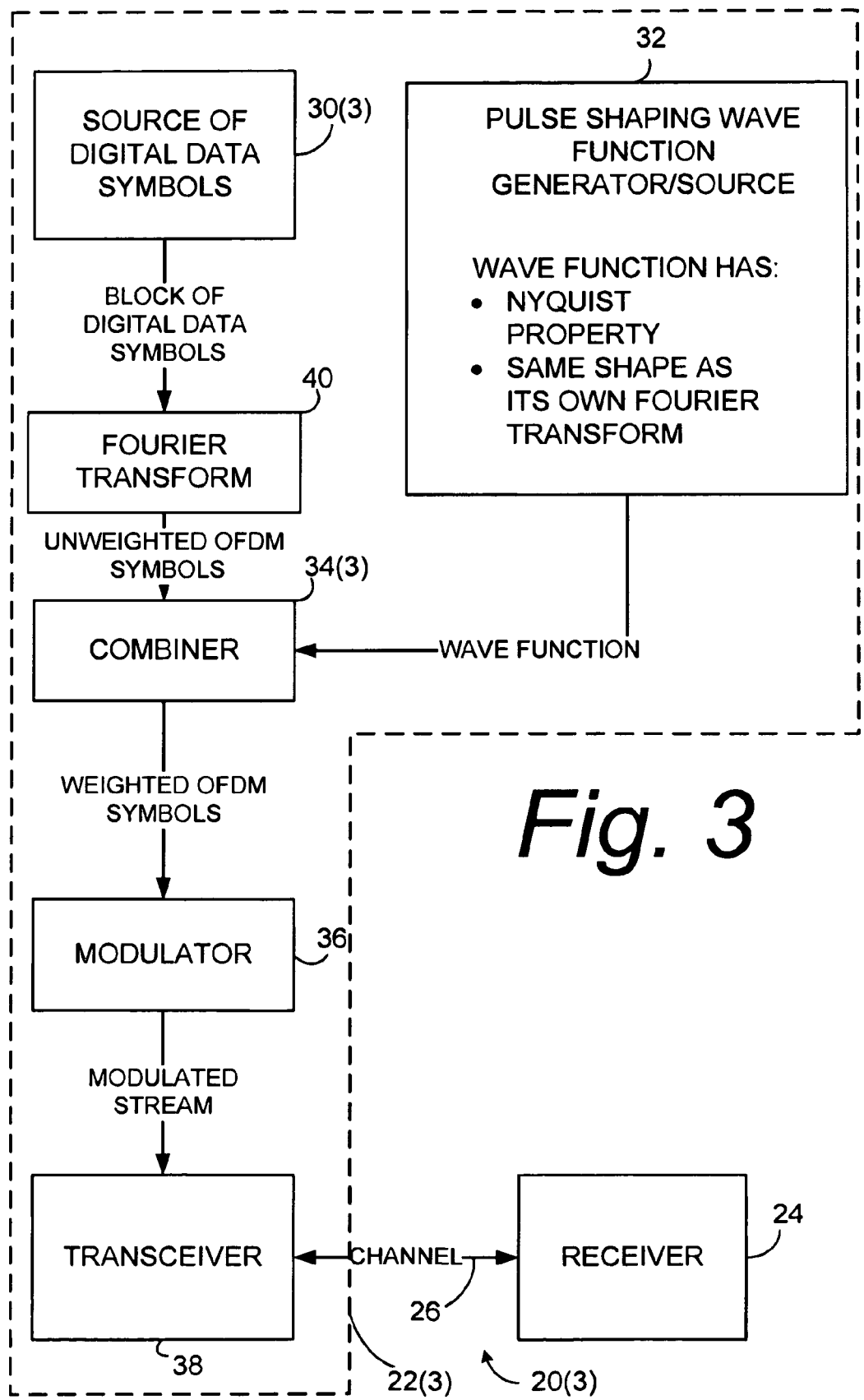
FIG. 3 is a schematic view of a communications system including a transmitter according to another example embodiment.

FIG. 3 shows an example embodiment of a communications network 20(3) and of transmitter 22(3) which is/are particularly suited for OFDM technology. Constituent components of transmitter 22(3) of FIG. 3 which resemble those of the embodiment of FIG. 1 are shown with subscripts of like number (some having parenthetical suffixes to denote a variation suitable for FIG. 3). In the FIG. 3 embodiment, the source 30(3) is configured to supply successive blocks of digital data symbols represented by blocks of complex numbers. The source 30(3) is connected to apply the blocks of digital data symbols to Fourier Transform 40. The Fourier Transform 40 performs a Fourier transform on each block of complex numbers (in a manner understood by the person skilled in the art) to produce an OFDM symbol, so that FIG. 3 depicts a stream of unweighted OFDM symbols emanating from Fourier Transform 40. The combiner 34(3) of FIG. 3 is configured to use the wave function (generated or obtained from pulse shaping wave function generator 32) to weight successive OFDM symbols and to combine successive weighted OFDM symbols to produce a weighted OFDM symbol for transmission.

Figure 4:
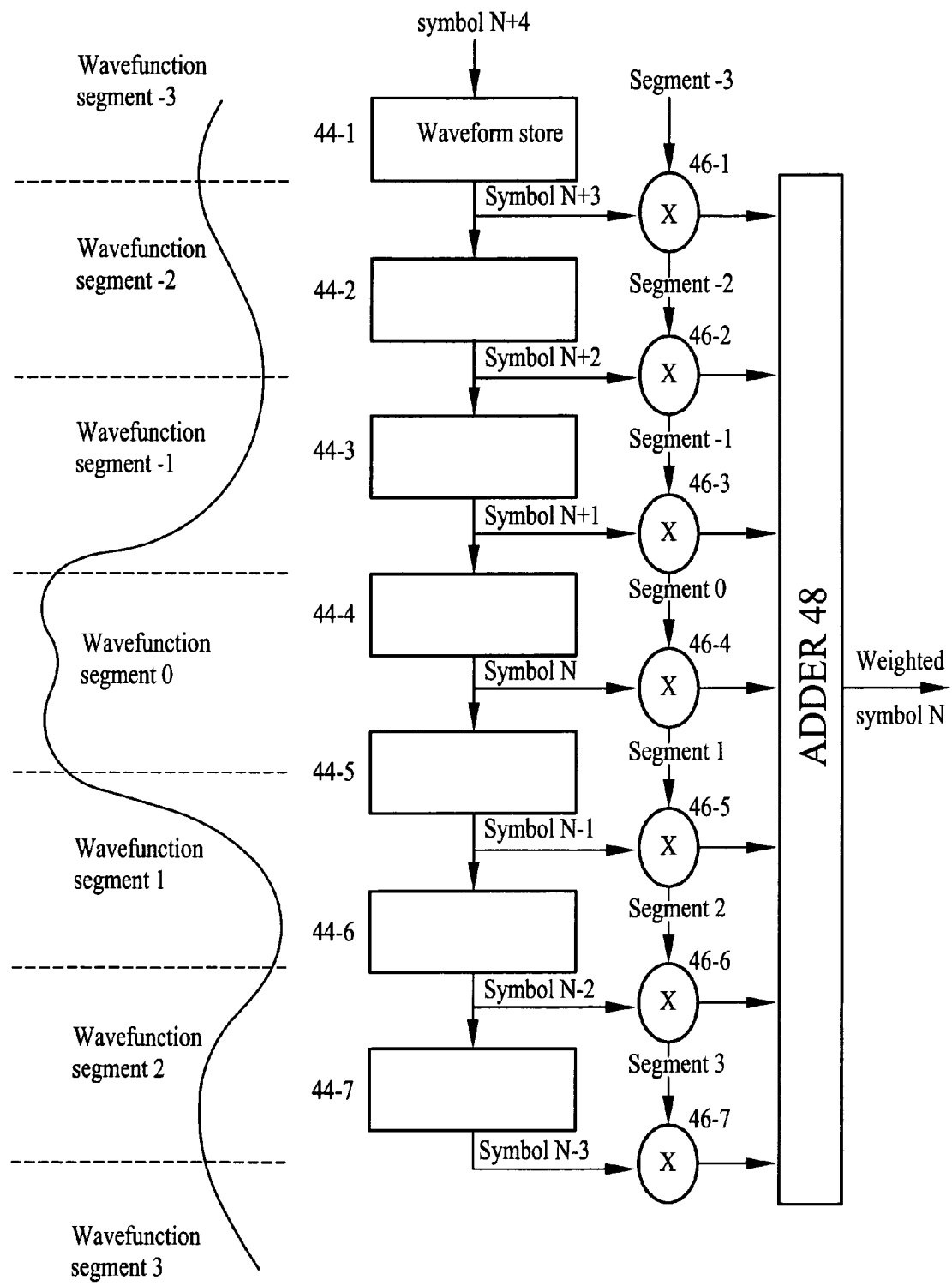
FIG. 4 is a schematic view of an example embodiment of a combiner suitable for use in the communications system of FIG. 3.

FIG. 4 shows an example implementation of the combiner 34(3) of FIG. 3. The combiner 34(3) comprises plural waveform storage elements, such as waveform stores 44-1 through and including 44-7. The waveform stores 44-1 to 44-7 receive waveforms for successive symbols. Each symbol waveform can comprise a plurality of values defining the symbol waveform over the symbol period. For an OFDM system of 1024 subcarriers for example, the waveform of one OFDM symbol is defined by at least 1024 complex values, or even 2048 values if 2:1 oversampling is used. The wave function to be used for shaping is divided into a number of segments, each segment containing the same number of points and therefore values as one symbol waveform. A symbol waveform is extracted from a waveform store and multiplied point by point with a corresponding segment of the wave function in multipliers 46-1 to 46-7. Thus using an example of a 1024-subcarrier OFDM system with 2:1 oversampling, the 2048 waveform points of symbol number N+3 are extracted from waveform store 44-1 and multiplied by corresponding points from 2048-point segment −3 of the shaping wave function. Likewise, 2048 waveform points for symbol N are extracted from waveform store 44-4 and multiplied point by point with 2048-point segment 0 of the shaping wave function. The weighting multiplications occur in multipliers 46-1 to 46-7 preferably in parallel, so that, as each point of a symbol is multiplied by a corresponding point of a shaping wave function segment, a weighted point from each multiplier flows through to adder 48 where the 7 points are combined to produce one point of the weighted output symbol waveform. When all 2048 points of each symbol have been weighted and combined in adder 48, 2048 points of the weighted output symbol will have been obtained, and are then transmitted after digital to analog (D to A) conversion, smoothing filtering, and modulation. The contents of the waveform stores are then shifted down one place, so that symbol waveform N−2 moves from store 44-6 to 44-7, waveform N−1 moves to store 44-6 and so on, with a new symbol waveform for symbol N+4 entering store 44-1. It will be appreciated that, instead of moving large numbers of data points between stores, a microprocessor or DSP can instead change addresses to a circular buffer memory from which values are read and written. In a case other than OFDM, for example if single-carrier QPSK were used, each symbol would typically be described by far fewer points—for example 16 points per symbol, and the shaping wave function would also be defined with the same reduced resolution.

Figure 5:
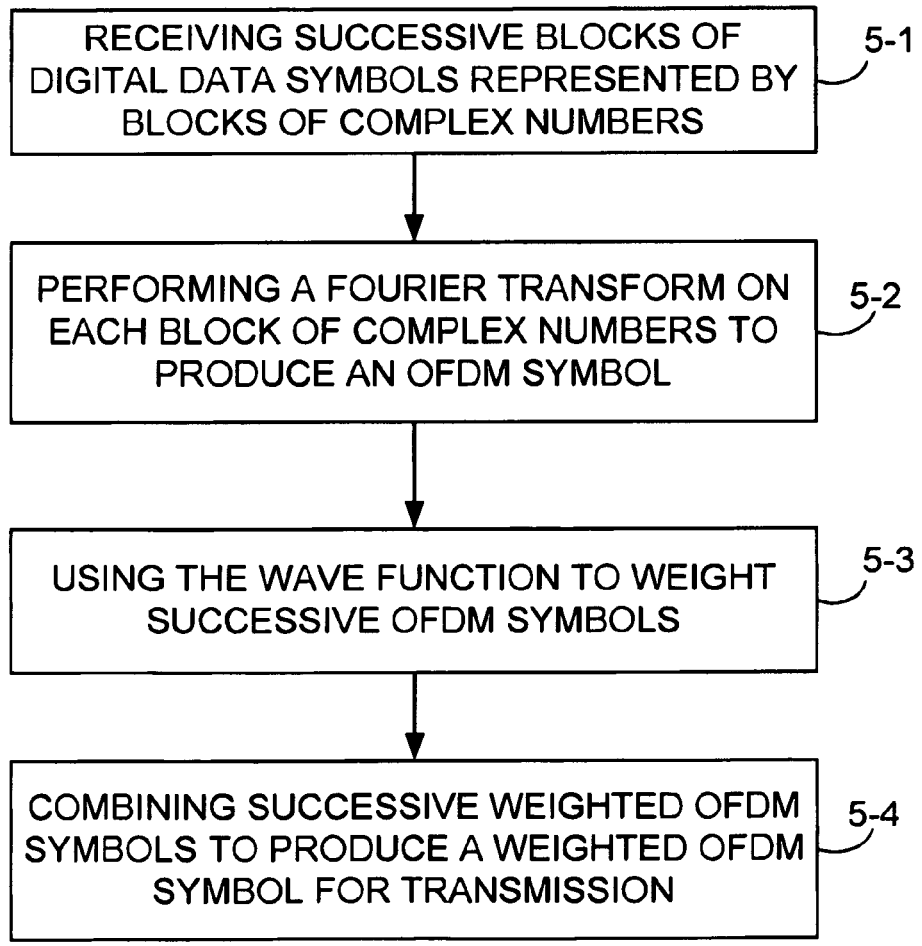
FIG. 5 is a flowchart of a method of operating a transmitter according to a second example mode.

FIG. 5 depicts basic, representative acts or steps performed in a mode of operation of an OFDM-suitable transmitter, such as transmitter 22(3) of FIG. 3. Example act 5-1 of FIG. 5 comprises reception (from source of information symbols 30(3)) of successive blocks of digital data symbols represented by blocks of complex numbers. Act 5-2 comprises performing a Fourier transform on each block of complex numbers to produce an OFDM symbol. Act 5-3 comprises using the wave function to weight successive OFDM symbols (in a manner understood with reference to the previous discussion of combiner 34(3) as well as other considerations described herein). Act 5-4 comprises combining successive weighted OFDM symbols to produce a weighted OFDM symbol for transmission. Such combining of successive weighted OFDM symbols can be performed, for example, by symbol adder 48, as described herein.

Figure 6:
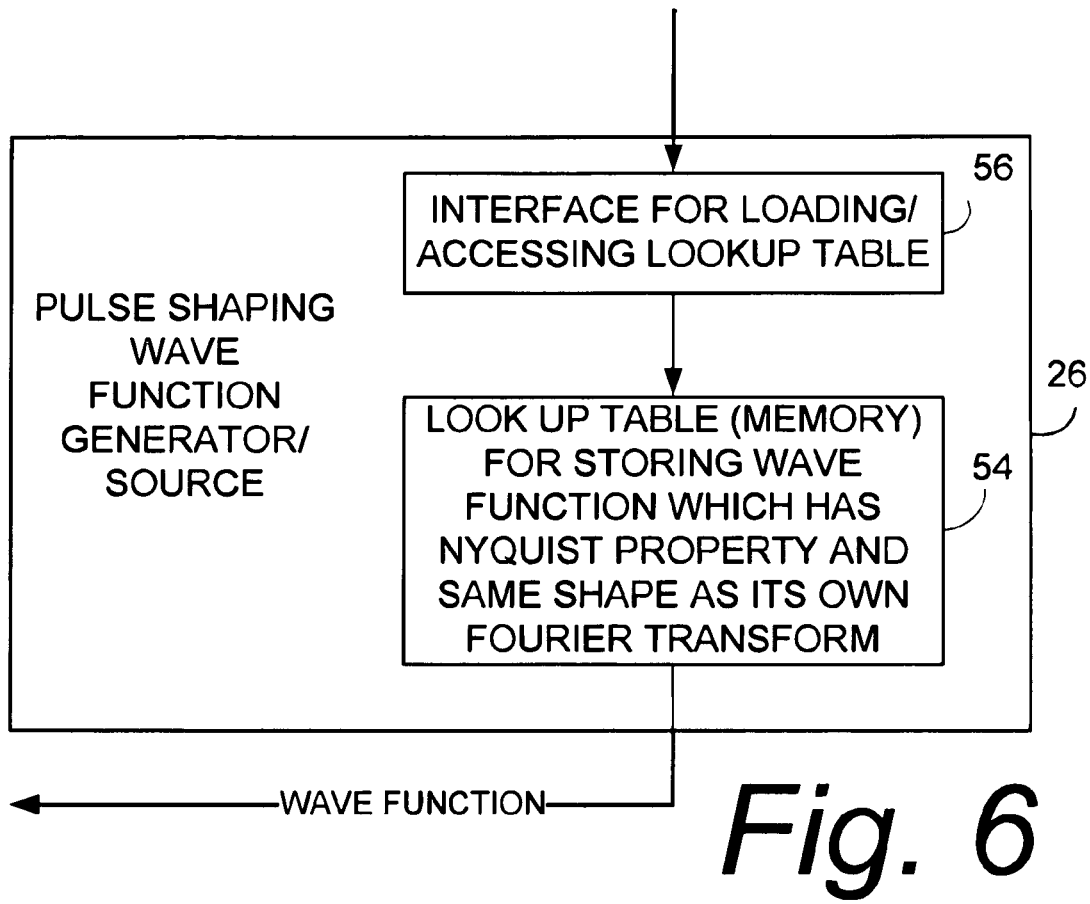
FIG. 6 is a schematic view of a wave shaping function generator according to an example embodiment.

FIG. 6 shows an example embodiment of a pulse shaping wave function generator, e.g., pulse shaping wave function generator 32(6), which may be embodied in an apparatus, comprising precomputed look-up table 54. The pulse shaping wave function generator 32(6) may also comprise interface 56 for loading into or accessing information from look-up table 54. In a typical apparatus, the wave function would only be loaded once during production, although in-service software updates could be used to provide alternate wave functions, if desired.

Figure 18:
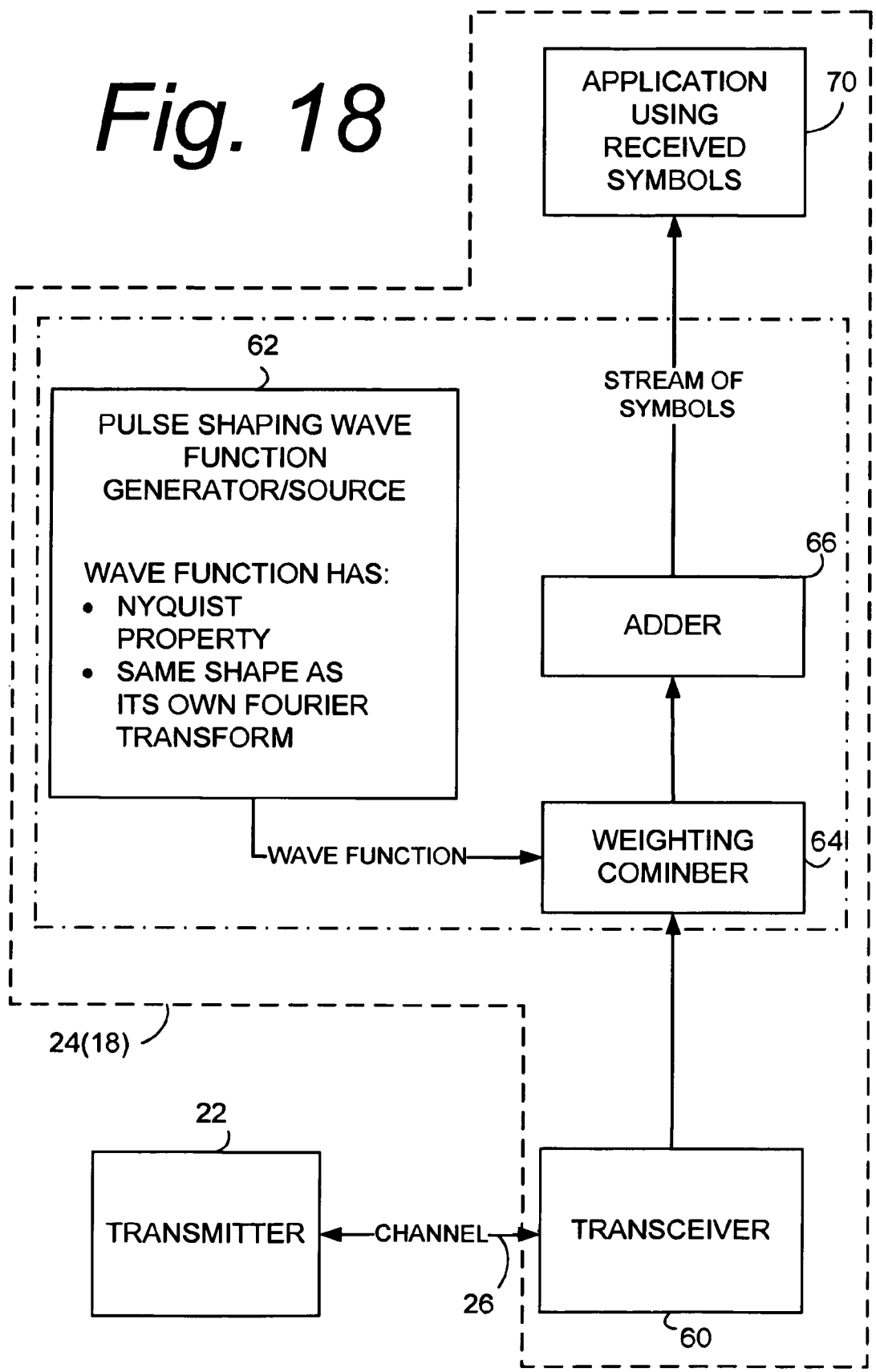
FIG. 18 is a schematic view of a communications system including a receiver according to an example embodiment

Techniques described herein can also be utilized in a receiver such as receiver 24(18) of FIG. 18. Receiver 24(18) comprises transceiver 60; pulse shaping wave generator 62; weighting combiner 64; adder 66. The transceiver 60 receives (over channel 26) the pulse-shaped symbol transmission and applies each symbol waveform received to the input of weighting combiner 64. The weighting combiner 64, pulse wave shaping function generator 62, and adder 66 of FIG. 18 are framed by dotted-dashed line to reflect the fact that aspects of these elements essentially function in like manner as the structure of FIG. 4, whose operation as been previously explained. Combiner 64 weights the symbol, already pulse-shaped once before transmission, with the pulse shape again (obtained from pulse shaping wave generator 62) to obtain a weighted, pulse-shaped received symbol. Then weighted, pulse-shaped received symbols separated by multiples of the symbol period in time are added by adder 66 (which is essentially the same as adder 48 of FIG. 4) to obtain a doubly pulse-shaped received symbol. The doubly pulse-shaped symbol, having been weighted by the square of the pulse shape, is then output to an application or user of the received symbols (e.g., application 70, which can include soft-error-correction decoding, speech or image decoding, or similar.). The doubly pulse-shaped signal, exhibits no Intersymbol Interference from other symbols due to the Nyquist property of the square of the pulse shape. Furthermore, because the pulse shape is its own Fourier transform, the Nyquist property also applies in the frequency domain such that, when the symbols are OFDM symbols, interference between sub-carriers of the same OFDM symbol is substantially cancelled, and interference between data symbols transmitted on the same subcarrier in different OFDM symbols is also substantially cancelled.

In an OFDM system, there may remain a small amount of Intersymbol Interference between data symbols transmitted on different subcarriers in different OFDM symbols, principally between data symbols that are transmitted on adjacent subcarriers in OFDM symbols that are transmitted adjacent in time, known as diagonal Intersymbol Interference. Such Diagonal ISI is either sufficiently small to be ignored or can be handled by equalizing techniques of moderate complexity.

Thus, as understood with reference to the foregoing and now explained in further detail, it is of interest to find pulse shapes that are root-Nyquist and whose Fourier Transforms are also root-Nyquist. For example, the IOTA pulse mentioned above is root-Nyquist in both domains. In one domain it is limited in extent, while in the other domain it is infinite. Thus such a function is clearly not equal to its own Fourier Transform. Either one may be selected to be the frequency or the time domain signal shape, but there is clearly a difference in system characteristics between the two cases. On the other hand, if a root-Nyquist function was also its own Fourier Transform, as disclosed and claimed herein, there would be no difference in system characteristics in terms of the time-extent of the pulse in one domain and the frequency extent in the other domain.

The problem of finding functions which are their own Fourier Transforms may be expressed in discrete numerical terms as one of finding the Eigenvectors of the discrete Fourier Transform (DFT) matrix, i.e. finding solutions $G'=(g1, g2, g3, \ldots gn)$ of $[H]G=vG$, where H is the DFT matrix, v is an Eigenvalue, and ' is used to mean transpose.

If a pulse centered within the N×N array G is desired, and likewise a symmetrical transform with zero frequency in the center, a DFT matrix is used with its rows and columns re-ordered to put the all-ones row and column at row/column number (N/2+1). An 8×8 example wherein w is the principal ⅛ root of unity is illustrated below:

| 1 | −1 | 1 | −1 | 1 | −1 | 1 | −1 |
|---|---|---|---|---|---|---|---|
| −1 | $w$ | $w^6$ | $w^3$ | 1 | $w^{-3}$ | $w^{-6}$ | $w^{-1}$ |
| 1 | $w^6$ | −1 | $w^2$ | 1 | $w^{-2}$ | −1 | $w^{-6}$ |
| −1 | $w^3$ | $w^2$ | $w$ | 1 | $w^{-1}$ | $w^{-2}$ | $w^{-3}$ |
| 1 | 1 | 1 | 1 | 1 | 1 | 1 | 1 |
| −1 | $w^{-3}$ | $w^{-2}$ | $w^{-1}$ | 1 | $w$ | $w^2$ | $w^3$ |
| 1 | $w^{-6}$ | −1 | $w^2$ | 1 | $w^2$ | −1 | $w^6$ |
| −1 | $w^{-1}$ | $w^{-6}$ | $w^{-3}$ | 1 | $w^3$ | $w^6$ | $w$ |

A half-channel offset DFT matrix may alternatively be used, which lacks the zero-frequency, zero-time element but which is perfectly symmetrical, as illustrated in FIG. 8 for the 8×8 case.

The eigenvalues of the non-half-channel-offset N×N DFT matrix (where N is a power of 2) are given by MATLAB as:

(N/4+1) eigenvalues of value root(N)

N/4 eigenvalues of value −root(N)

(N/4−1) eigenvalues of value i·root(N) and

N/4 eigenvalues of value −i·root(N)

It may seem odd that the imaginary roots do not occur in conjugate pairs, but a check that the product of the eigenvalues equals the determinant of the matrix verifies that this is because the determinant of the DFT matrix is imaginary and equal to $i \cdot N^2$.

It is now shown that the eigenvectors of the above DFT matrix are real and symmetrical for the case of real eigenvalues. The DTF matrix comprises a symmetrical (even) real part WR and a skew-symmetric imaginary part WI. Let the real part of the eigenvector have an even part ER and an odd part OR and likewise the imaginary part is EI+OI. Since (WR+jWI) (ER+OR+jEI+jOI)=v(ER+OR+jEI+jOI) by the definition of the eigenvector, and using the fact that the dot product of two odd functions is even, we can equate real and imaginary, odd and even parts to get $WR \cdot ER - WI \cdot OI = v \cdot ER$ $WR \cdot OR - WI \cdot EI = v \cdot OR = 0$ because the product of even WR with OR is zero as is the product of odd WI with even EI $WR \cdot OI + WI \cdot ER = v \cdot EI = 0$ because the product of even WR with OR is zero as is the product of odd WI with even EI $WR \cdot EI + IR \cdot OR = v \cdot OI = 0$ by virtue of R and OR being zero from the above Hence the eigenvectors of the DFT matrix for real eigenvalues are real, even (i.e., symmetrical) functions given by the only surviving equation:

$WR \cdot ER = v \cdot ER$

Examining only the real part of the DFT matrix we see that (N/2−1) rows are repeated so are not independent equations, leaving (N/2+1) independent rows. Also, because of the mirror symmetry of the eigenvector, the number of unknowns is only (N/2+1) and each of the remaining rows may be folded to yield an eigenvector equation with a matrix of size (N/2+1) square with all quantities real, the exemplary matrix for the N=8 case being shown by Expression 1.

$$\text{Re}\begin{bmatrix} 1 & -2 & 2 & -2 & -1 \\ -1 & 2w & 2w^6 & 2w^3 & 1 \\ 1 & 2w^6 & -2 & 2w^2 & 1 \\ -1 & 2w^3 & 2w^2 & 2w & 1 \\ 1 & 2 & 2 & 2 & 1 \end{bmatrix} \quad \text{Expression 1}$$

An eigenvector equation is clearly rank-deficient because the eigenvalue is chosen to make the determinant of the equations zero. Normally it can often be solved by picking one unknown to be unity, and moving it to the right hand side. The now rectangular matrix is multiplied by its own transpose to obtain a square matrix, hopefully with full rank, which can then be inverted to solve for the remaining unknowns in terms of the assumed unknown. If desired, the solution can then be normalized to a unit vector by dividing all elements of the eigenvector by the square root of the sum of their squares. When the eigenvalues are multiple however, the eigenvector equation is rank deficient by more than just one.

The rank of the above folded matrices is listed in Table 1 for various DFT sizes.

TABLE 1

| DFT SIZE | FOLDED SIZE | RANK | DEFICIENCY |
|---|---|---|---|
| 16 × 16 | 9 × 9 | 4 | 5 |
| 64 × 64 | 33 × 33 | 16 | 17 |
| 256 × 256 | 127 × 127 | 32 | 95 |

There are evidently a very large number of spare degrees of freedom left after specifying that a function shall be its own Fourier Transform. The Gaussian function is but one of a continuum of functions with this property. Some other conditions must/may be specified in order to define a particular solution.

The extra conditions imposed here require the function also to be root-Nyquist. Since it is its own Fourier Transform (FT), that means it will be root-Nyquist in both the time end frequency domain as desired for an OFDM application.

Figure 9:
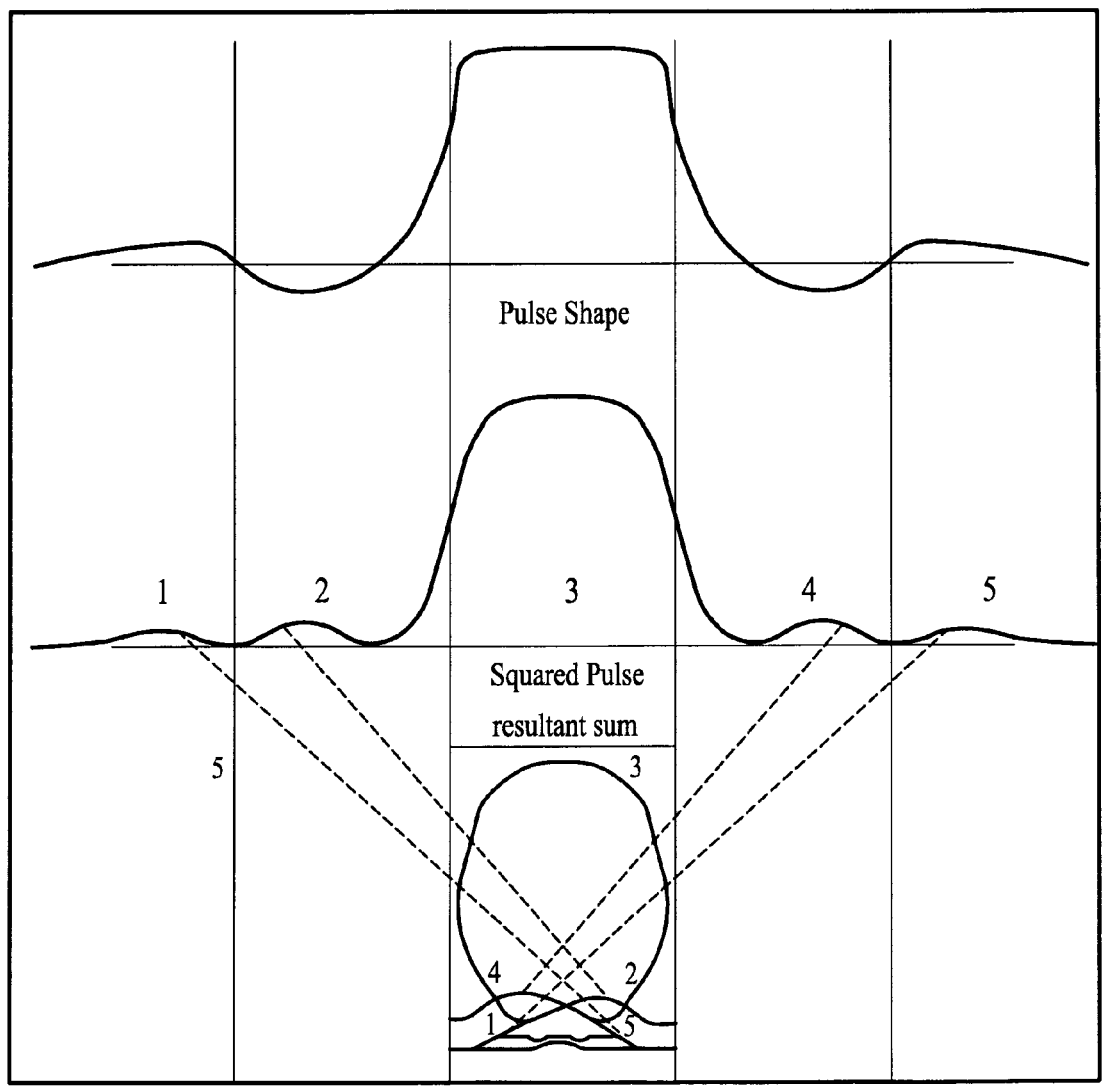
FIG. 9 is a graphical view showing that the Nyquist criterion in the frequency domain is that, when the received block-repeats are weighted by a matched windowing function and added together, the result is a flat net weighting over the block.

The Nyquist criterion in the frequency domain is that, when the received weighted symbols are weighted and combined again by a matched windowing function and added together, in a manner identical to that described by the process of FIG. 4, the result is a flat net weighting over the block. This is the criterion is illustrated in FIG. 9.

In discrete-time terms, the sum of the squares of function values spaced by the block spacing shall be unity. To apply this criterion accurately in the discrete time domain, there must be an integral number of time points per OFDM block period.

For an integral number of block periods over the analysis window, the number of blocks in the analysis window must also be a power of two, $2^{N1}$, if the analysis window comprises a power of two points $2^N$. The pulse shape is then defined with a time-sampling density of $2^{N-N1}$ points per block period. The block frequency is $2^{N1}$ times the reciprocal of the analysis period, i.e., there are $2^{N1}$ frequency samples defining the subcarrier spectral shape. If the spectral shape defined by the transformed array is identical to the pulse shape defined by the time-domain array therefore, 2N1 must be equal to $2^{N-N1}$ giving N1=N/2, hence the number of blocks over the analysis window must be the square root of the transform size and the number of samples (time samples per block or frequency samples per block frequency spacing) must also be the square root of the transform size. Hence the transform size must be a square, such as 16, or 64, or 256, but not an odd power of two such as 32.

The Nyquist criterion can now be expressed for the 16-point transform case as:

$g1^2 + g5^2 + g9^2 + g5^2 = 1$ $g2^2 + g6^2 + g8^2 + g4^2 = 1$ $g3^2 + g7^2 + g7^2 + g3^2 = 1$ $g4^2 + g8^2 + g6^2 + g2^2 = 1$ where the symmetry of the array (g1, g2, . . . g9, g10, . . . g16) about g9 has been used to replace g10 by g8, g11 by g7, etc.

The above constitute only three independent equations. One method of solution is to make an initial guess at five of the g-elements, then solve the rank-4 eigenvalue equation for the remaining 4 elements. Supposing that elements g9, g8, g7, g6 and g1 are the initially guessed values, then the solution for g2, g3, g4, and g5 is given by Expression 2.

$$\begin{pmatrix} g2 \\ g3 \\ g4 \\ g5 \end{pmatrix} = [A_{4X5}] \begin{pmatrix} g1 \\ g6 \\ g7 \\ g8 \\ g9 \end{pmatrix}$$

Expression 2 where the matrix A is given by $[w_1'w_1]^-w_1'w_2$, where w1 is columns 2, 3, 4, and 5 of the folded DFT matrix and w2 is columns 1, 6, 7, 8 and 9.

The results are then normalized to force the three Nyquist Equations to be satisfied. The normalized values of the initially guessed elements are then substituted and the eigenvalue equation solved again, repeating iteratively until convergence.

Figure 10:
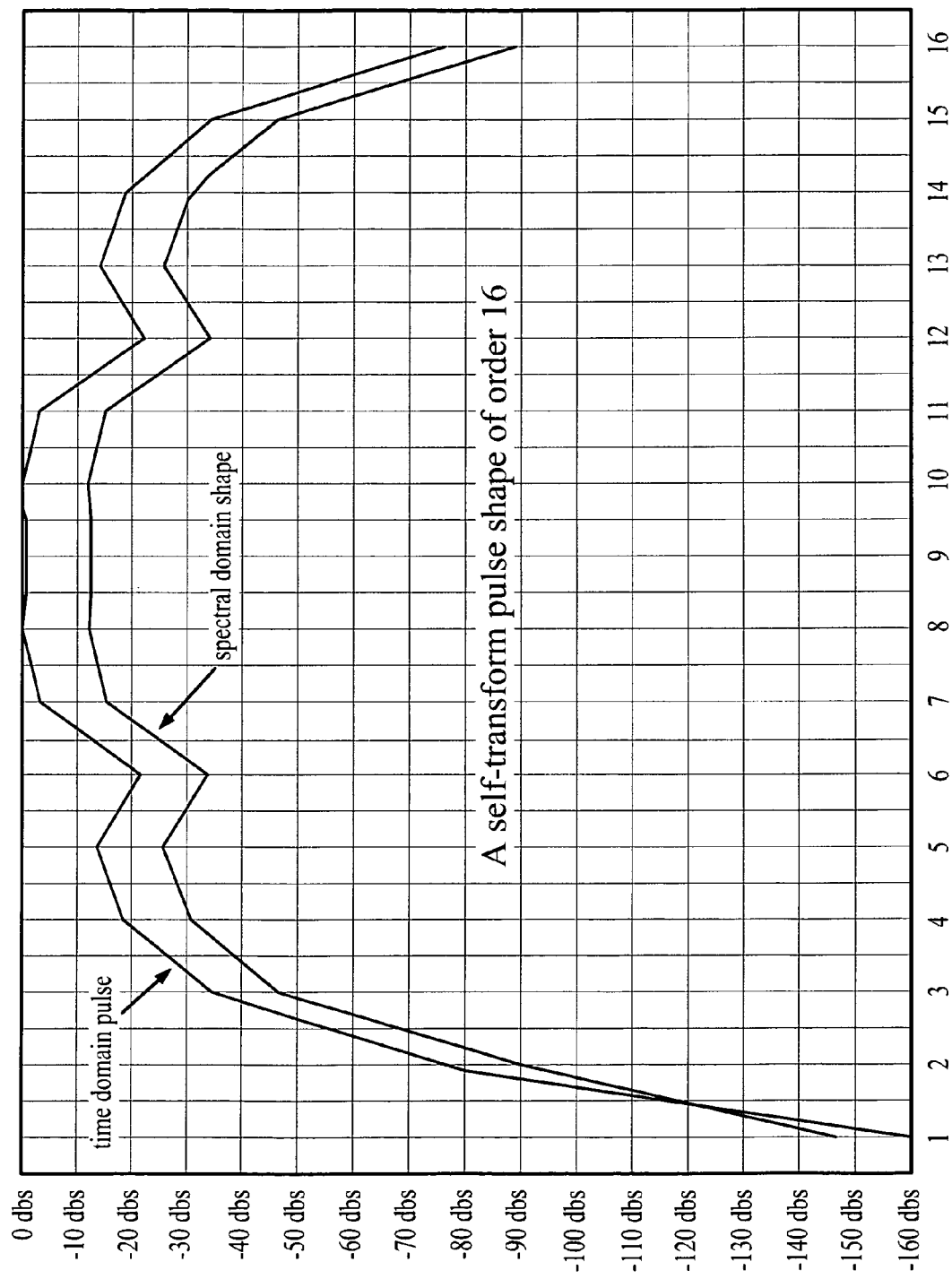
FIG. 10 is a graphical view of a self-transform pulse shape of order sixteen.

Because there are only seven equations for nine unknowns, the solution is underspecified by two degrees of freedom. It may be seen that, because initial guesses g6 and g8 are normalized by the same Nyquist equation, their ratio will not change from the initial guess. This reveals one of the degrees of freedom that remain unused. The second may be specified by choosing g1 to be zero for example. A family of solutions can be generated all having g1=0 and characterized by different values of g6/g8. Particular values of g6/g8 can be tried empirically to result in a desirable pulse shape, as shown in FIG. 10.

Figure 11:
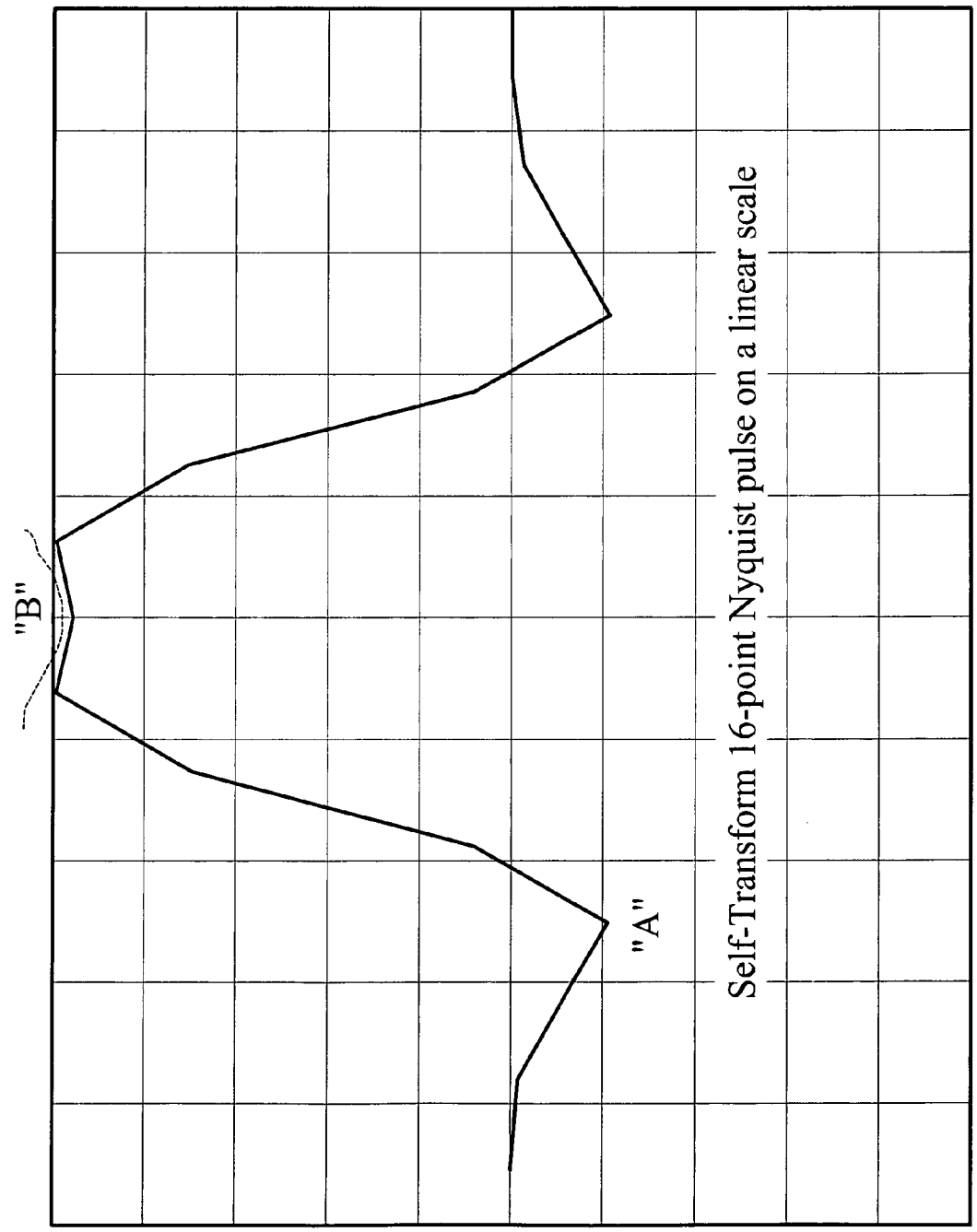
FIG. 11 is a graphical view of the self-transform pulse shape of FIG. 10 shown on a linear scale.

An unusual feature of these pulses, more easily seen on the linear scale of FIG. 11, is the double-humped peak. This is explainable for pulses that are both Nyquist and their own Fourier Transforms, for the following reasons:

1. To be Nyquist in the time domain, there is a negative first sidelobe (feature "A") centered root(N) points away to make the autocorrelation function have zeros spaced at the symbol (block) period.

2. In the transform domain, the negative first sidelobe translates to a negative cosine ripple of frequency root(N), which is exactly one cycle over the block period. This causes the double-hump ('B').

To obtain a 64-point pulse, the rank-deficiency of 17 of the eigenvalue equation must be filled by other conditions. The Nyquist criterion supplies five additional equations in the 64-point case, as follows:

$g1^2+g9^2+g17^2+g25^2+g33^2+g25^2+g17^2+g9^2=1$ $g2^2+g10^2+g18^2+g26^2+g32^2+g24^2+g16^2+g8^2=1$ $g3^2+g11^2+g19^2+g27^2+g31^2+g23^2+g15^2+g7^2=1$ $g4^2+g12^2+g20^2+g28^2+g31^2+g23^2+g15^2+g7^2=1$ $g5^2+g13^2+g21^2+g29^2+g30^2+g22^2+g14^2+g6^2=1$

In general, the Nyquist criterion yields root(n)+2 equations, but pairs of equations are identical.

Thus twelve extra criteria can be specified to define a particular 64-point pulse. In the context of OFDM, a useful criterion could be to specify that the correlation shall be zero between two pulses offset in time by one or more multiples of the block period and in frequency by one or multiples of the reciprocal block period. The IOTA pulse achieves zero correlation for all such offsets, but only for either the real or the imaginary part of the correlation, and at the possible expense of spectral containment. Other criteria could be to require as many derivatives of the pulse shape as possible to be zero at the ends, with truncation in mind, in order to reduce the impact of truncation. Odd order derivatives d/dt, d/dt3 etc are automatically zero in the center and at the extremity of the pulse (g1) due to it being an even-order circular function.

For the 16-point case for example, the second order derivative is zero at the end point (g1) if (64, −49, 36, −25, 16, −9, 4, −1, 0, −1, 4, −9, 16, −25, 36, −49).G=0.

Folding due to the symmetry of G, an extra row is obtained to be combined with the eigenvalue equation, the row being:

(64, −98, 72, −50, 32, −18, 8, −2, 0), and the equations can then be solved.

This direct numerical method is not elaborated further, as in practice it is desired to specify the function using many more points than 16, or even 256, for example as many as 65536 points nay be desired. It is difficult to solve systems of this many equations, as inverting 32 k×32 k matrices is fraught with numerical issues.

Figure 7:
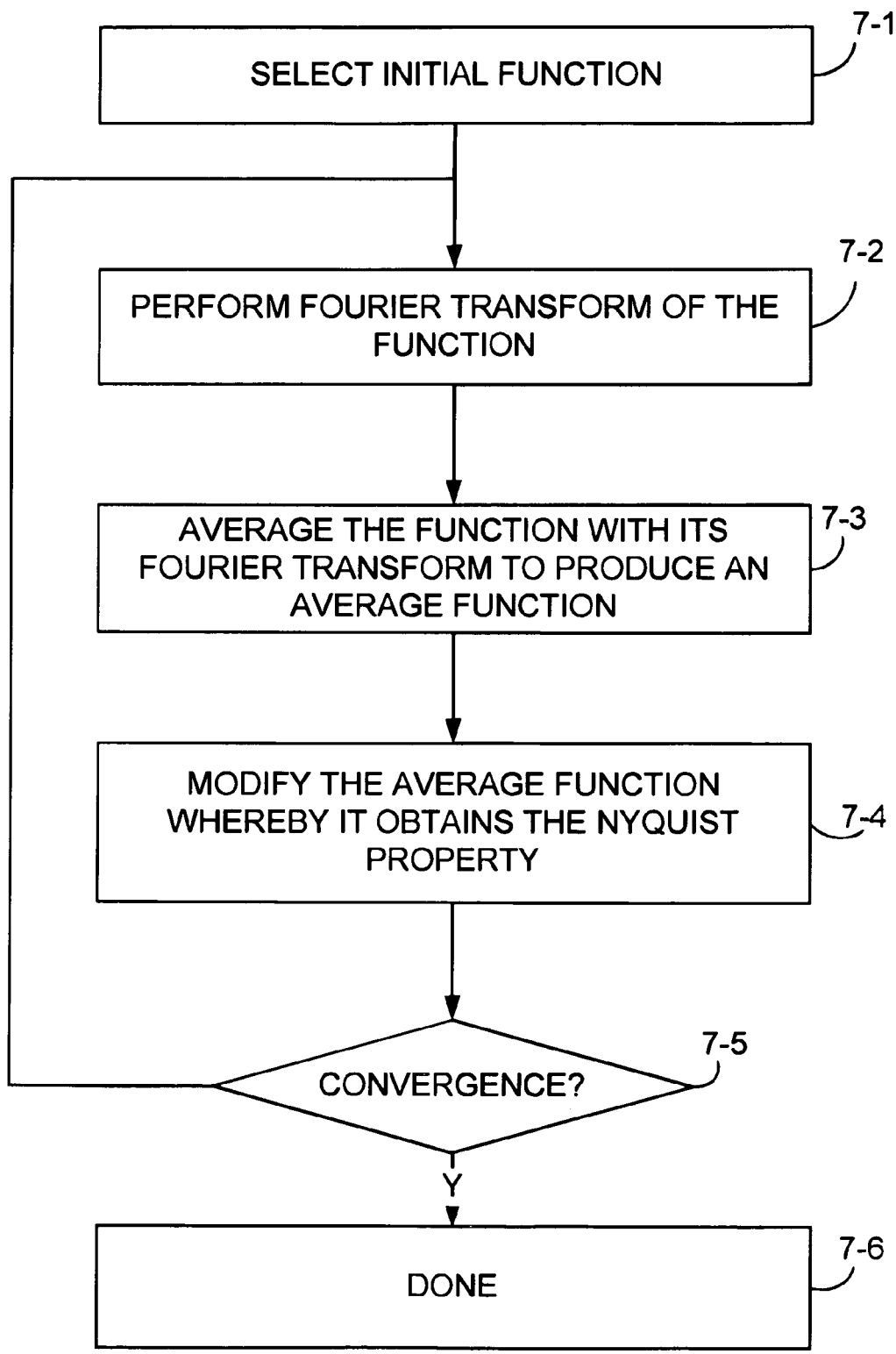
FIG. 7 is a flowchart of a method of generating a wave shaping function according to an example mode.

Instead, for finding functions to a high resolution, a method such as that having basic acts or steps as shown in FIG. 7 can be used:

act 7-1: Start with an approximate function resembling the desired result, for example, a Gaussian function of appropriate width.

act 7-2: Fourier transform the function using an FFT routine.

act 7-3: Average the function with its Fourier Transform.

act 7-4: Modify the average function to have the Nyquist property by dividing the value of each point by the square root of the sum of the squares of points spaced by root(N) points, including that point.

act 7-5: Repeat from step 7-2 until convergence (act 7-6) is achieved.

Figure 12:
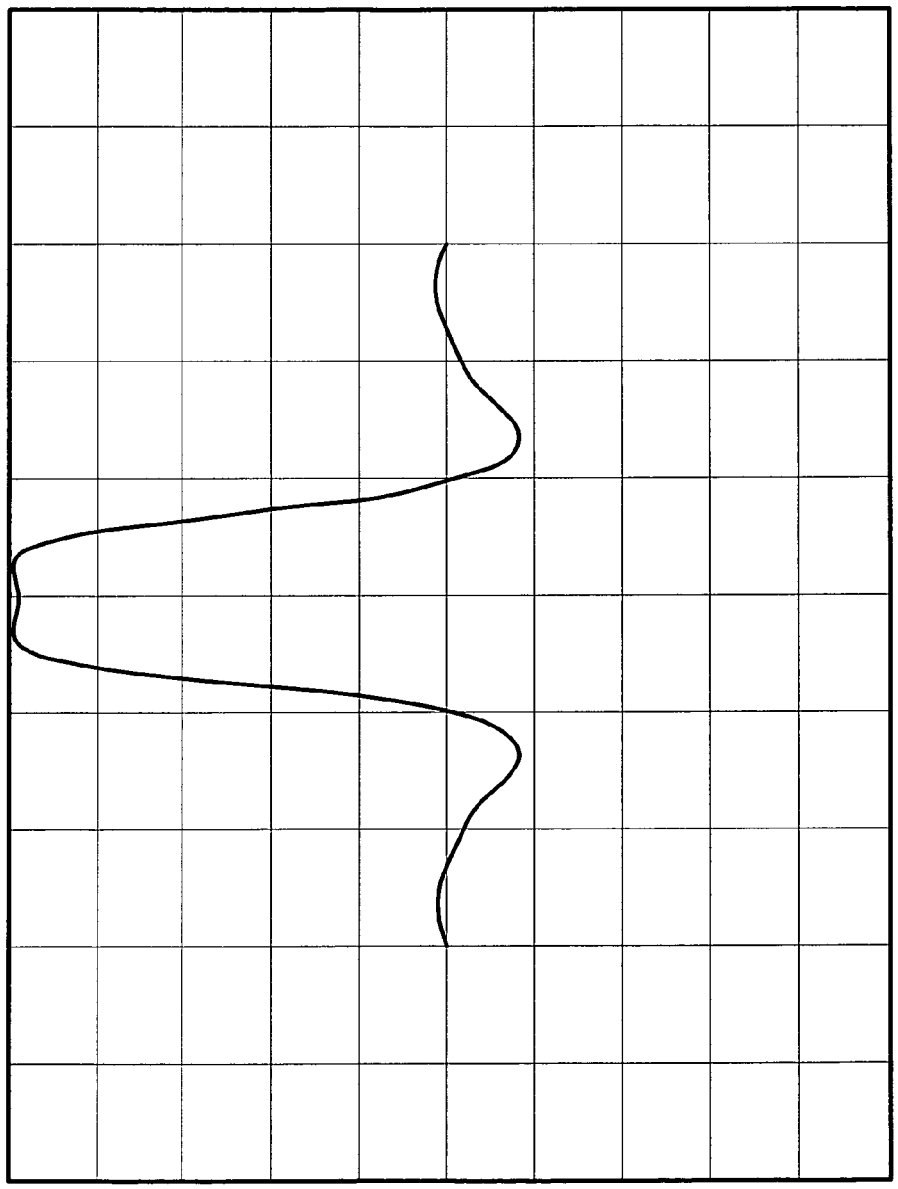
FIG. 12 is a graphical view of a first pulse shape generating using a method of FIG. 7.
Figure 13:
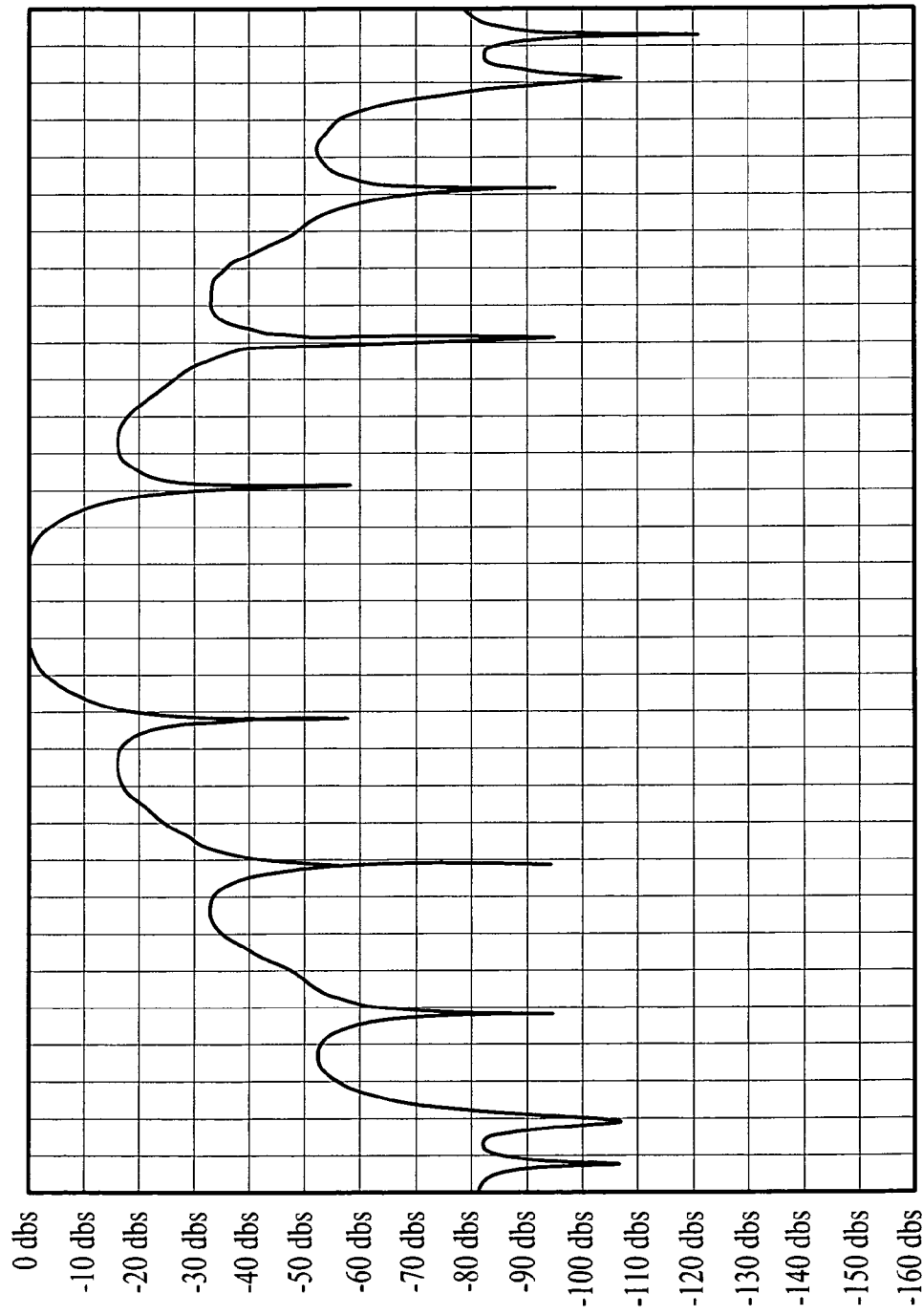
FIG. 13 is a graphical view of the logmagnitude of the pulse of FIG. 12.

Using the above procedure, the pulse shape of FIG. 12 was produced. The logmagnitude of this pulse is also the logmagnitude of its spectrum and is shown in FIG. 13.

Figure 14:
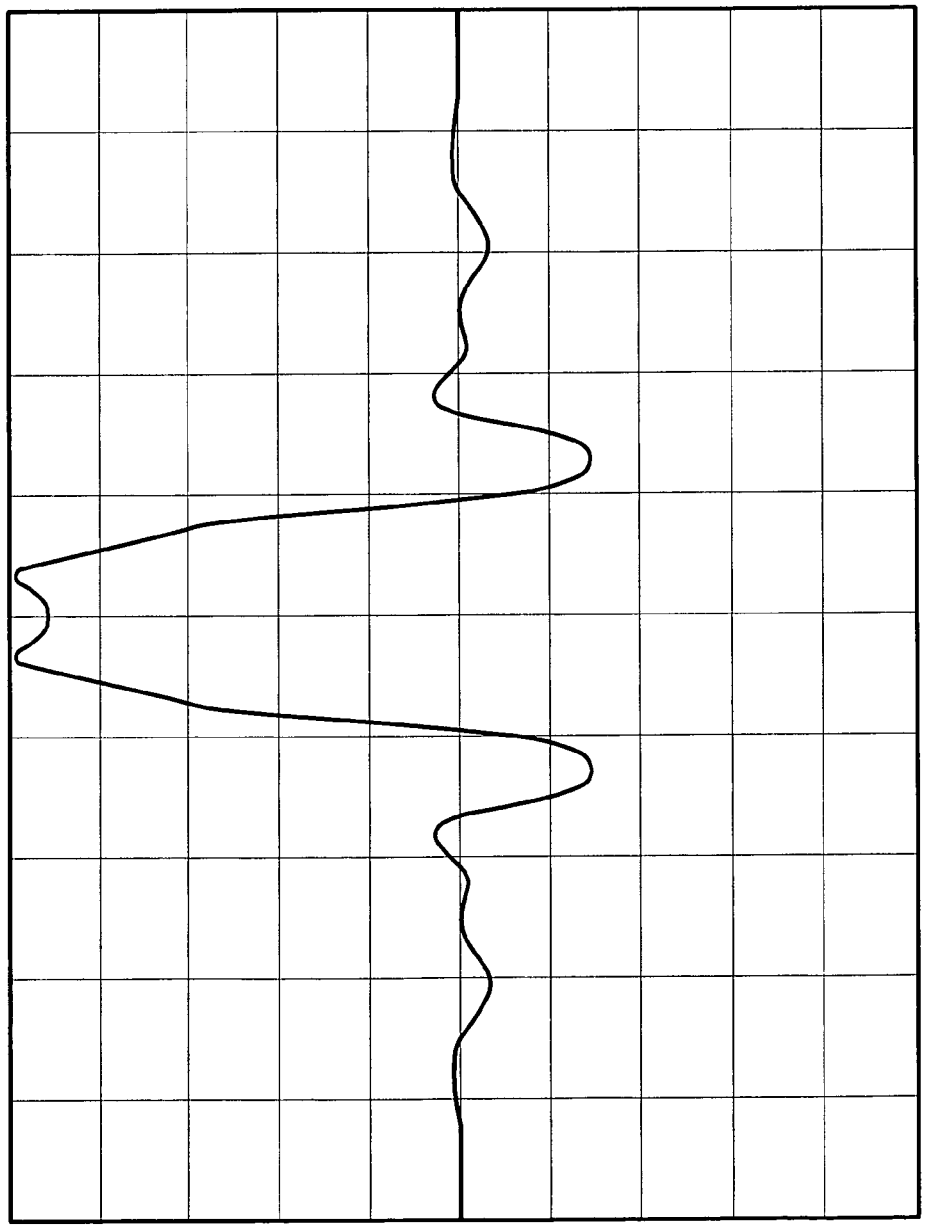
FIG. 14 is a graphical view of another first pulse shape, but for a Gaussian function of width −1 dB.
Figure 15:
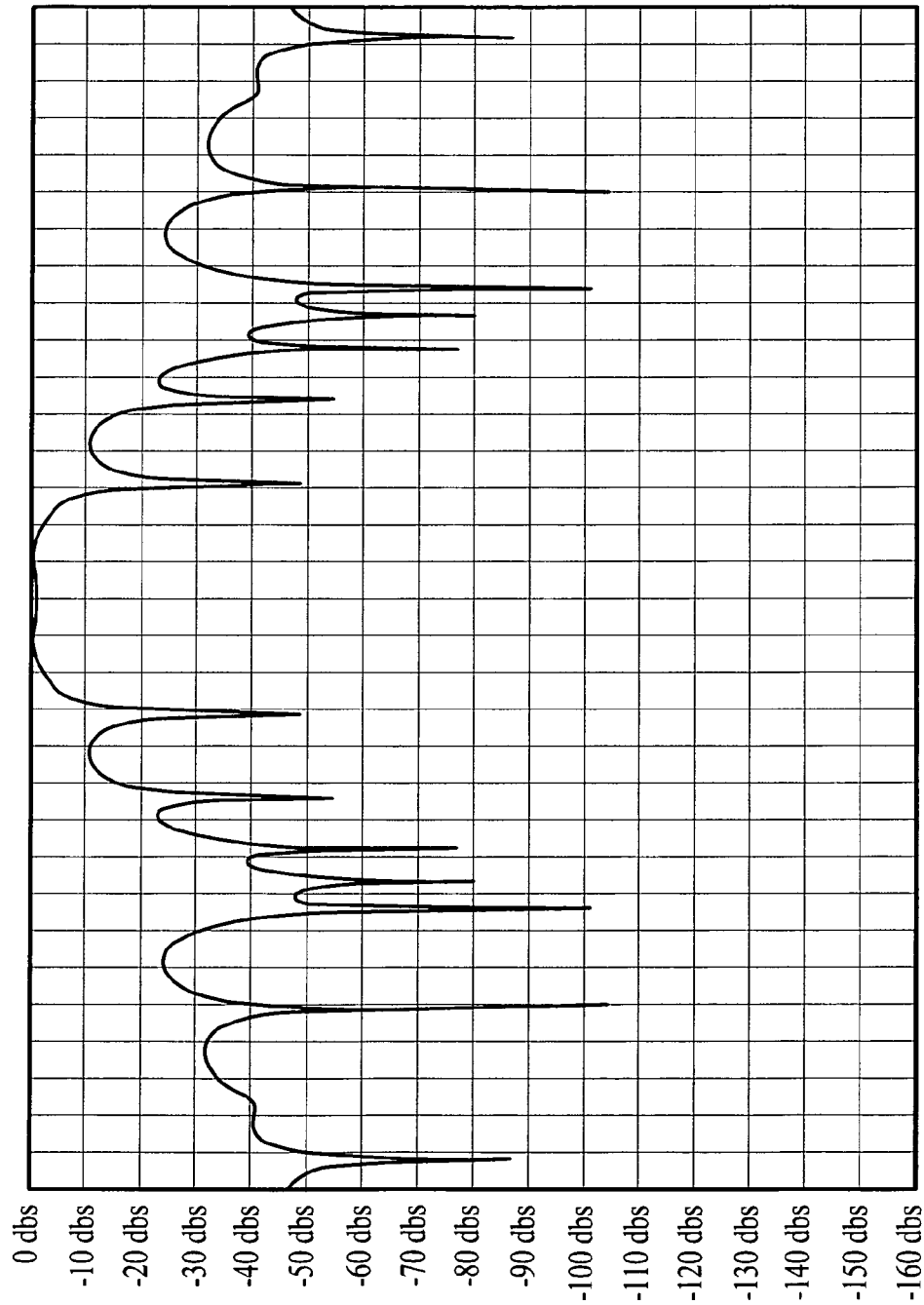
FIG. 15 is a graphical view of the logmagnitude of the pulse of FIG. 14.
Figure 16:
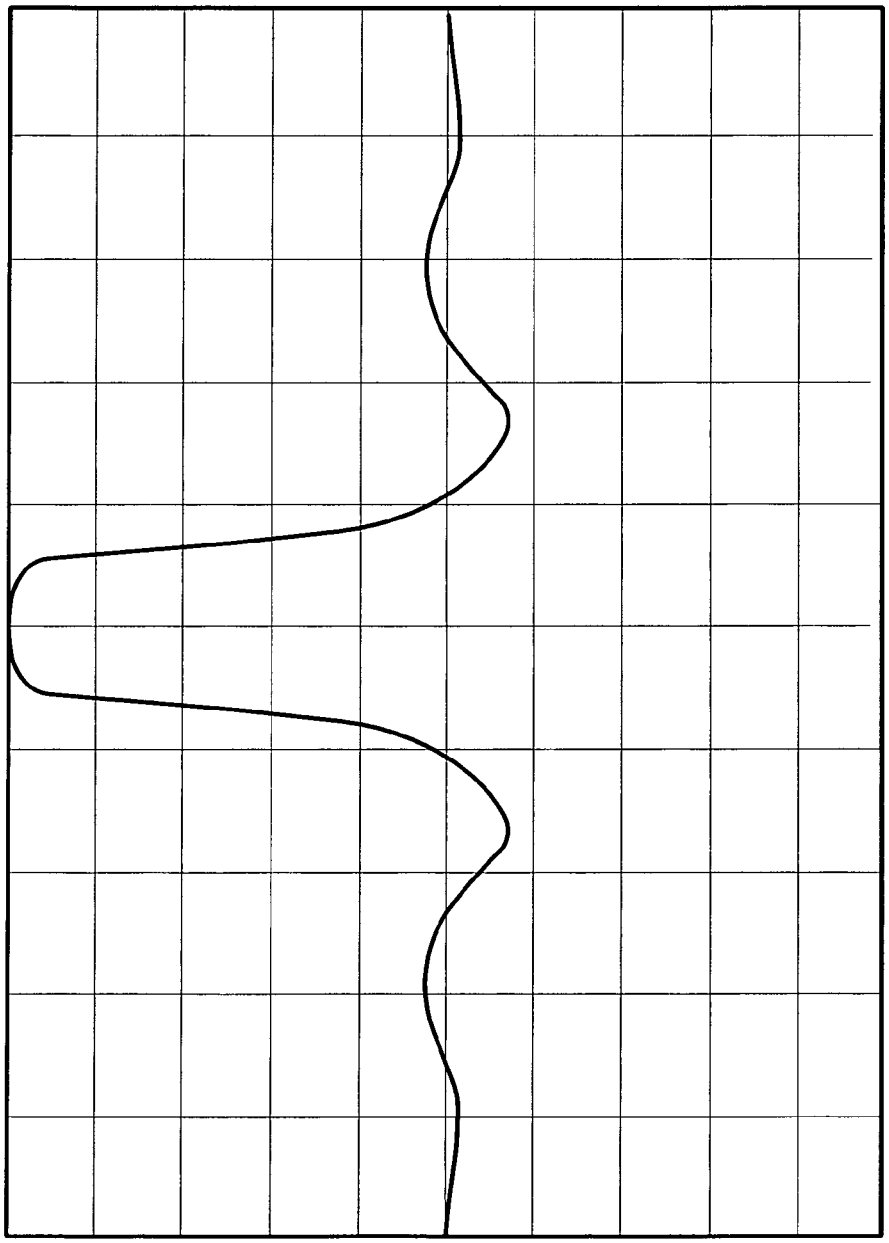
FIG. 16 is a graphical view of another first pulse shape, but for a Gaussian function of width −20 dB.
Figure 17:
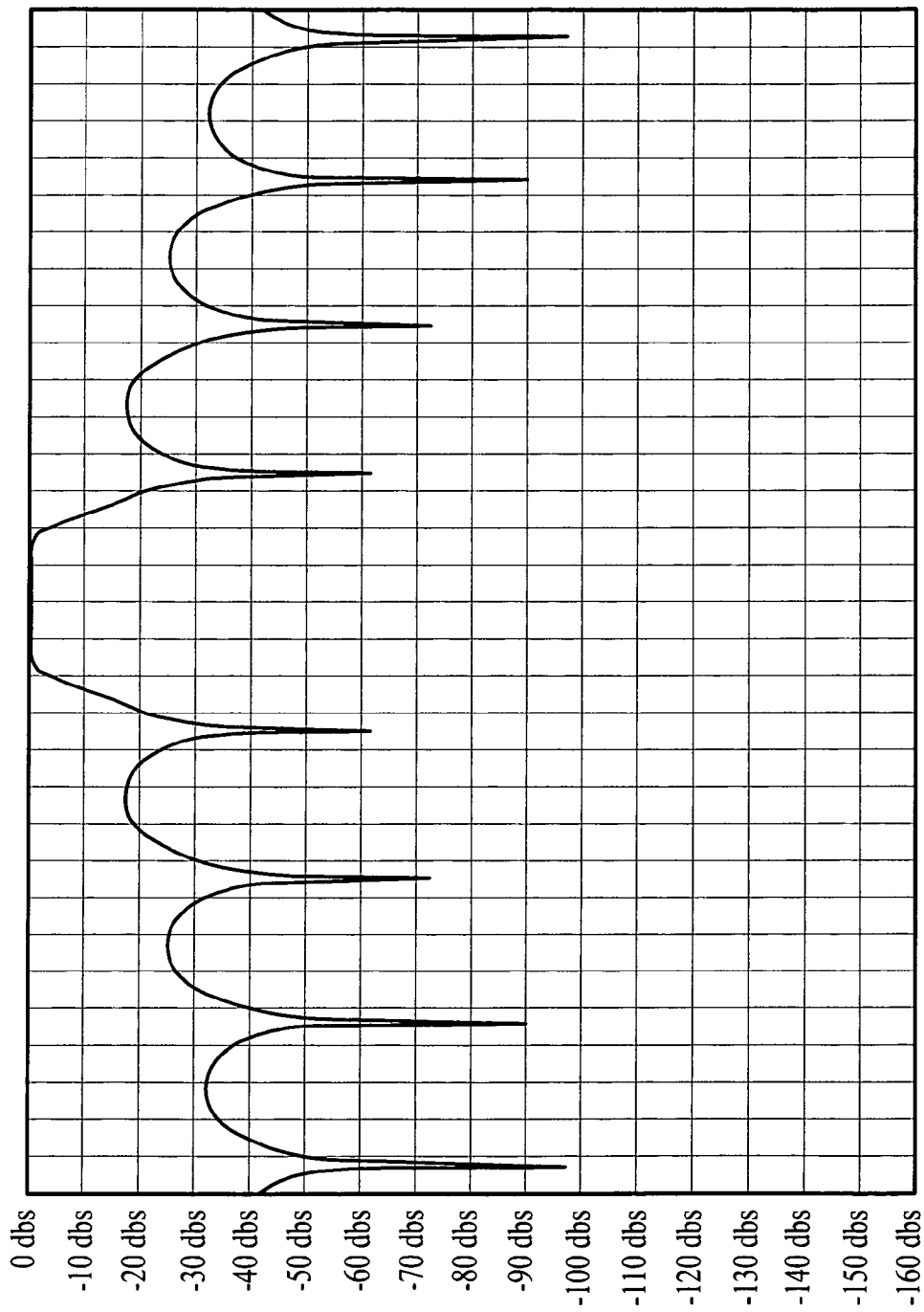
FIG. 17 is a graphical view of the logmagnitude of the pulse of FIG. 16.

Other examples of pulse shapes produced by initializing the above process with Gaussian functions of different widths are shown for Gaussian −1 dB in FIG. 14 and FIG. 15, and for Gaussian −20 dB in FIG. 16 and FIG. 17.

All of the above exemplary pulses have, like the Gaussian function, the property that they are their own Fourier Transforms. However, unlike the Gaussian function, they have the additional property of being Root-Nyquist. An infinite variety of such pulse shapes can be produced by the above method by starting with different prototype functions and forcing then iteratively to conform to the desired properties. It is possible that, for particular applications, functions with more desirable properties in those applications could be produced than the few illustrated herein. All however are characterized by being root-Nyquist and their own Fourier Transforms.

Since the pulses of FIG. 12, FIG. 14, and FIG. 16 are all root-Nyquist, they will have a magnitude of 1/root(2) or 0.7071 or −3 dB at the block width. At about +/−3 block widths from center, the pulses have fallen substantially—to the −80 dB region for the pulse spectrum of FIG. 14. Thus, to implement a transmitter using the pulse of FIG. 12 and FIG. 13, each transmitted signal value need depend on no more than about seven successive symbols—three ahead of the current symbol and three behind.

It is well known in the art how to construct such transmitters for a finite symbol alphabet using look-up tables. For example, for a binary alphabet, there are only 27=128 possible different combinations of seven successive binary symbols, and furthermore half of those combinations are the negatives of the other half. Therefore only sixty four distinct waveforms can be produced over a symbol period, and these can be precomputed and stored in a small look-up table. It is also known in the prior art to precompute and then code the waveforms into 1-bit Sigma-Delta modulations samples that need only one bit per sample to store. This allows subsequent conversion to analog modulation waveforms using only low pass filters, eliminating digital to analog (DAC) converters. This is described in U.S. Pat. No. 5,530,722; U.S. Pat. No. 5,867,537; and U.S. Pat. No. 7,046,738, which are all hereby incorporated by reference herein.

When the symbols become multi-valued, as in an OFDM symbol, other methods can be used.

An OFDM symbol is constructed from a block of, e.g., 1024 data symbols by first replacing each data symbol with a unique complex number assigned to represent the data symbol. For example, bit-pairs 00, 01, 11, 10 may be represented by the complex numbers 1+j, −1+j, −1−j and 1−j, respectively, the representation then being known as QPSK. The block of complex numbers is then Fourier Transformed using a Fast Fourier Transform (FFT) to obtain the 1024-point OFDM symbol waveform. The 1024 OFDM symbol waveform values are then weighted by the 1024 corresponding values around the center or peak part of the desired pulse shape (e.g., the pulse of FIG. 12) and added to the values obtained by weighting the waveforms of adjacent OFDM symbols with adjacent blocks of 1024 pulse values. As explained above, only three symbols to the left and three symbols to the right of the current symbol need typically be considered. Thus, a block of 1024 signal values are obtained that depend on seven successive 1024-point OFDM symbol waveforms, weighted with appropriate 1024-point segments of the pulse shape. This operation costs seven multiply-accumulate operations (MACs) per transmit signal sample, or proportionally more for oversampling. The foregoing is also understood with reference to FIG. 4 and FIG. 5.

In oversampling, the 1024 complex symbol-representative values may be FFTed using a 2048-point transform, by first forming a 2048-symbol block with 512 zero-symbols appended to either side. The 2048-point OFDM symbol waveform so produced is then weighted using 2048-point segments of the desired pulse shape to produce 2048-point blocks of transmit signal samples. The advantage of oversampling is that, upon digital to analog conversion, the signal can be smoothed using low-pass filters of relaxed specification.

Thus a practical OFDM system employing 2:1 oversampling may cost fourteen MACs per transmitted data symbol. By data symbol is meant the data symbol that is modulated on one OFDM subcarrier. Thus one OFDM symbol of 1024 subcarriers carries 1024 data symbols. For reasonable data rates, such operations can be performed by a Programmable Digital Signal Processor (DSP), but for very high data rates, special purpose hardware, possibly employing many arithmetic units operating in parallel, can be used.

As disclosed above, e.g., with reference to FIG. 6, and as understood with reference to U.S. Pat. No. 6,219,375 (incorporated herein by reference), look-up tables may also be used to simplify weighted addition of a set of multi-bit values. Effectively, the multi-bit values are used by selecting one bit of like significance from each value at a time to give a vector of single bit values. This is applied to a precomputed look-up table to get a partial result. Repeating for each successive significant bit and adding partial results with relative bit shifting produces the desired weighted value. This method costs N accumulates and no multiplies per data symbol, times two for 2:1 oversampling, where N is the length in bits of the multi-bit values. Whether 2N look-up and accumulate operations are simpler than 14 multiply-accumulate operations can be determined by an arithmetic logic designer skilled in the art. A specific advantage of an OFDM scheme using the above method is that particular parts of the spectrum can be protected from use by omitting symbols from the OFDM block before FFTing that would lie in and around that part of the spectrum, so called "excision". This can arise if existing wireless services exist in such a portion of the spectrum and require to be protected from interference by the OFDM system.

Thus it has been shown how to define functions that have specific and useful properties in both the time and frequency domain and how to use these functions for transmitting and receiving digital date using either conventional modulation techniques or OFDM schemes.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A transmitter for transmitting information symbols based on signals that are shaped in time and frequency domains by a wave function wherein the transmitter comprises:
   a pulse shaping wave function generator configured to provide a wave function having the following properties:
   (a) the wave function has the same shape as its own Fourier transform; and
   (b) the wave function produces a Nyquist property, whereby an autocorrelation function of the wave function is zero at intervals spaced by the symbol period from its peak;
   a combiner configured to combine the wave function with a stream of digital data symbols to produce a filtered stream of data symbols; and
   a transceiver configured to transmit the filtered stream of data symbols over a channel.

2. The device of claim 1, wherein a square of the wave function, when segmented into segments of one symbol period duration and the segments folded on top of each other and added, produces a flat segment constant in value.

3. The device of claim 1, wherein the transmitter further comprises a Fourier Transform configured to produce the stream of digital data symbols by Fourier Transforming successive blocks of digital data symbols represented by complex numbers to produce successive unweighted OFDM symbols, each unweighted OFDM symbol being a block of complex values, and the combiner is further configured to combine successive ones of said OFDM symbols using said wave function as a weighting function to produce a weighted OFDM symbol for transmission.

4. The device of claim 1, wherein the pulse shaping wave function generator comprises a memory configured to store a precomputed look-up table, and wherein the pulse shaping wave function generator is configured to provide the wave function by loading a wave function from a plurality of precomputed wave functions stored in the look-up table.

5. The device of claim 4, wherein said weighting is performed with the aid of a precomputed look-up table.

6. A transmitter comprising:
   a source of symbols;
   a pulse shaping wave function generator configured to provide a wave function which is root-Nyquist and has the same shape as its own Fourier transform, wherein an autocorrelation function of the wave function is zero at intervals spaced by the symbol period from its peak;
   a combiner configured to express the symbols received from the source as signals which are shaped in time and frequency domains by the wave function; and
   a transceiver configured to transmit the shaped signals over a channel.

7. The transmitter of claim 6, wherein the combiner is configured to combine the wave function with a stream of digital data symbols to produce a filtered stream of symbols for transmission by the transmitter.

8. The transmitter of claim 6, wherein:
   the source is configured to supply successive blocks of digital data symbols represented by blocks of complex numbers;
   the transmitter further comprises a Fourier transform configured to perform a Fourier transform on each block of complex numbers to produce an OFDM symbol;
   wherein the combiner is configured to use the wave function to weight successive OFDM symbols and to combine successive weighted OFDM symbols to produce a symbol for transmission which is a weighted OFDM symbol.

9. The transmitter of claim 6, wherein the pulse shaping wave function generator comprises a memory comprising a precomputed look-up table.

10. A receiver for receiving pulse-shaped symbol transmission, comprising:
    a transceiver configured to receive pulse-shaped symbol waveforms over a channel;
    a pulse shaping wave function generator configured to provide a wave function which is root-Nyquist and has a same shape as its own Fourier transform, wherein an autocorrelation function of the wave function is zero at intervals spaced by the symbol period from its peak;
    a weighting combiner configured to weight received pulse-shaped symbol waveforms with the wave function to obtain doubly-weighted, pulse-shaped symbol waveforms; and
    an adder configured to combine doubly-weighted symbol waveforms separated in time by integer multiples of the symbol period to obtain symbols exhibiting substantially reduced Intersymbol Interference.

11. A method of operating a transmitter comprising:
    obtaining a stream of input symbols;
    using a pulse shaping wave function generator to provide a wave function which is root-Nyquist and has the same shape as its own Fourier transform, whereby an autocorrelation function of the wave function is zero at intervals spaced by the symbol period from its peak;
    using a combiner to combine the wave function with the stream of input symbols to produce a filtered stream of data symbols in which the input symbols are expressed as signals which are shaped in time and frequency domains by the wave function; and
    using a transceiver to transmit the filtered stream of data symbols over a channel.

12. The method of claim 11, further comprising:
    receiving successive blocks of digital data symbols represented by blocks of complex numbers;
    performing a Fourier transform on each block of complex numbers to produce an OFDM symbol;
    using the wave function to weight successive OFDM symbols; and,
    combining successive weighted OFDM symbols to produce a symbol for transmission which is a weighted OFDM symbol.

13. The method of claim 11, further comprising obtaining the wave function by loading, from a memory comprising a precomputed look-up table, one of a plurality of precomputed wave functions stored in the look-up table.

* * * * *

UNITED STATES PATENT AND TRADEMARK OFFICE
CERTIFICATE OF CORRECTION

PATENT NO. : 8,259,845 B2  
APPLICATION NO. : 12/126576  
DATED : September 4, 2012  
INVENTOR(S) : Dent Page 1 of 1

It is certified that error appears in the above-identified patent and that said Letters Patent is hereby corrected as shown below:

On the Cover Page, item (56), under "OTHER PUBLICATIONS", in Column 2, Line 2, delete "PCAT/US2008/064743." and insert -- PCT/US2008/064743. --, therefor.

On the Cover Page, item (56), under "OTHER PUBLICATIONS", in Column 2, Line 4, delete "Data-Ratetransmission" and insert -- Data-Rate transmission --, therefor.

In the drawings: in Fig. 18, Sheet 17 of 17, for Tag "64", in Line 2, delete "COMINBER" and insert -- COMBINER --, therefor.

In Column 2, Line 32, delete "(Isoptropic" and insert -- (Isotropic --, therefor.

In Column 4, Line 47, delete "embodiment" and insert -- embodiment. --, therefor.

In Column 9, Line 22, delete "DTF" and insert -- DFT --, therefor.

In Column 9, Line 39, delete "R" and insert -- RI --, therefor.

In Column 9, Line 40, delete "above" and insert -- above. --, therefor.

In Column 11, Line 16, delete "$[w_1^t w_1]^- w_1^t w_2,$" and insert -- $[w_1^t w_1]^{-1} w_1^t w_2$, --, therefor.

In Column 15, Line 17, in Claim 5, delete "claim 4," and insert -- claim 3, --, therefor.

Signed and Sealed this  
Fifth Day of February, 2013

Teresa Stanek Rea  
*Acting Director of the United States Patent and Trademark Office*